United States Patent
Oya et al.

(10) Patent No.: US 12,390,962 B2
(45) Date of Patent: *Aug. 19, 2025

(54) FOAM MOLDED PRODUCT AND METHOD FOR PRODUCING THE SAME

(71) Applicant: TOYOBO CO., LTD., Osaka (JP)

(72) Inventors: Kenzo Oya, Shiga (JP); Takuya Akaishi, Shiga (JP); Eri Morio, Shiga (JP)

(73) Assignee: TOYOBO MC CORPORATION, Osaka (JP)

(*) Notice: Subject to any disclaimer, the term of this patent is extended or adjusted under 35 U.S.C. 154(b) by 253 days.

This patent is subject to a terminal disclaimer.

(21) Appl. No.: 18/032,279

(22) PCT Filed: Oct. 15, 2021

(86) PCT No.: PCT/JP2021/038276
§ 371 (c)(1),
(2) Date: Apr. 17, 2023

(87) PCT Pub. No.: WO2022/085592
PCT Pub. Date: Apr. 28, 2022

(65) Prior Publication Data
US 2023/0390975 A1    Dec. 7, 2023

(30) Foreign Application Priority Data

Oct. 20, 2020 (JP) ................ 2020-176133
Apr. 27, 2021 (JP) ................ 2021-074976

(51) Int. Cl.
*B29C 44/06* (2006.01)
*B29C 44/34* (2006.01)
(Continued)

(52) U.S. Cl.
CPC .......... *B29C 44/06* (2013.01); *B29C 44/3403* (2013.01); *B32B 5/22* (2013.01);
(Continued)

(58) Field of Classification Search
CPC .............. C08J 9/00–9/42; B32B 5/18–5/20
See application file for complete search history.

(56) References Cited

U.S. PATENT DOCUMENTS 5,158,986 A    10/1992    Cha et al.
5,334,356 A    8/1994    Baldwin et al.
(Continued)

FOREIGN PATENT DOCUMENTS

CN    110382607    10/2019
JP    6-506724    7/1994
(Continued)

OTHER PUBLICATIONS

International Search Report (ISR) issued Dec. 21, 2021 in International (PCT) Application No. PCT/JP2021/038276.
(Continued)

*Primary Examiner* — Prashant J Khatri
(74) *Attorney, Agent, or Firm* — Wenderoth, Lind & Ponack, L.L.P.

(57) ABSTRACT

The present invention is to provide a thermoplastic polyester elastomer resin foam molded product which exhibits light weight, excellent rebound resilience and excellent surface smoothness. A foam molded product including a continuous phase formed of a resin component containing a thermoplastic polyester elastomer, wherein the thermoplastic polyester elastomer is prepared by bonding a hard segment and a soft segment, wherein the hard segment consists of polyester constituted from aromatic dicarboxylic acid and aliphatic and/or alicyclic diol as constituting components, wherein the soft segment is at least one member selected
(Continued)

from a group consisting of aliphatic polyether, aliphatic polyester and aliphatic polycarbonate, wherein the foam molded product is constituted from, as a surface layer ranging from a surface of the foam molded product to a depth of 1000 μm, a surface layer consisting of only a foamed region in which a non-foamed portion having a cell density of 10% or less is not present, or the foam molded product has, as a surface layer ranging from a surface of the foam molded product to a depth of 1000 μm, a surface layer consisting of both a foamed region in which the non-foamed portion is present and a foamed region in which the non-foamed portion is not present, and wherein the foam molded product has a density of 0.01 to 0.70 g/cm$^3$.

4 Claims, 3 Drawing Sheets

(51) Int. Cl.
  *B29K 67/00* (2006.01)
  *B29K 105/04* (2006.01)
  *B32B 5/22* (2006.01)
(52) U.S. Cl.
  CPC ...... *B29K 2067/00* (2013.01); *B29K 2105/04* (2013.01); *B29K 2995/0063* (2013.01)

(56) References Cited

U.S. PATENT DOCUMENTS

| | | |
|---|---|---|
| 2013/0011657 A1 | 1/2013 | Kato et al. |
| 2020/0123341 A1 | 4/2020 | Morio et al. |

FOREIGN PATENT DOCUMENTS

| | | |
|---|---|---|
| JP | 2003-138054 | 5/2003 |
| JP | 2003-533371 | 11/2003 |
| JP | 2003-342343 | 12/2003 |
| JP | 2007-182025 | 7/2007 |
| JP | 2009-214345 | 9/2009 |
| JP | 2011-68819 | 4/2011 |
| JP | 2013-32492 | 2/2013 |
| JP | WO2015/182721 | 12/2015 |
| JP | 6358369 | 7/2018 |
| JP | 2019-6926 | 1/2019 |
| JP | 2019-6927 | 1/2019 |
| JP | 2019-218460 | 12/2019 |
| JP | 2020-75993 | 5/2020 |
| WO | 96/10476 | 4/1996 |
| WO | WO-2019004121 A1 * | 1/2019 ............ B29C 44/42 |

OTHER PUBLICATIONS

Extended European Search Report issued Aug. 29, 2024 in European Patent Application No. 21882733.5.

* cited by examiner

FOAM MOLDED PRODUCT AND METHOD FOR PRODUCING THE SAME

TECHNICAL FIELD OF THE INVENTION

The present invention relates to a foam molded product that is produced using counter-pressure and includes a continuous phase formed of a resin component containing a thermoplastic polyester elastomer. In further detail, the foam molded product according to the present invention is a foam molded product having excellent rebound resilience and surface smoothness. It is thus possible to provide a foam molded product obtained by high foaming as high as double or more foaming.

BACKGROUND ART

A thermoplastic polyester elastomer exhibits excellent injection molding ability and excellent extrusion molding ability, high mechanical strength, excellent rubber properties such as elasticity recovery, shock resistance and flexibility, as well as excellent cold resistance. Therefore, the thermoplastic polyester elastomer has been used in fields such as automobile parts, electric/electronic parts, fiber, film and sports parts.

A thermoplastic polyester elastomer exhibits excellent heat aging resistance, excellent light resistance and excellent abrasion resistance. Therefore, a thermoplastic polyester elastomer has been adopted as automobile parts and particularly for parts to be used under high-temperature environments and for interior parts of automobiles. In recent years, there has been a demand to reduce a weight of resin parts. As to one of the means for achieving such an object, application of foam molded product may be exemplified.

One of high foaming methods for weight reduction is a core-back foam injection molding method in which a mold is moved in the mold opening direction at the time of foaming. This method enables double or more high foaming and further makes fine cells in a foamed layer, therefore increasing the rebound resilience (Please see Patent Document 1).

The foam molded products manufactured by the core-back foam injection molding method, however, include non-foamed skin layers as surface layers and a foamed layer as an inner layer and thus have a sandwich structure including the non-foamed skin layers and the foamed layer in the thickness direction. Due to the presence of the non-foamed skin layers, the rebound properties of the foamed layer are reduced and the rebound resilience is thus decreased. In addition, such molded products have poor surface smoothness due to the generation of unevenness caused by defects, such as a swirl mark and a pit, on the surface of the molded products.

A short-shot foam injection molding method enables the production of foam molded products having a thin skin layer. The method, however, has problems of a low foaming ratio and is poor in lightness (Please see Patent Document 2).

As to a foamed product being advantageously used for car sheet, a highly repulsive urethane foamed product which exhibits rebound resilience of 60% or more has been advantageously adopted. In Patent Document 3, a method for preparing such urethane foamed product is proposed. However, a urethane foam product generates a cyan gas upon burning. Accordingly, there is a problem of environment pollution.

PRIOR ART DOCUMENTS

Patent Documents

Patent Document 1: Japanese Patent No. 6,358,369
Patent Document 2: Japanese Patent Application Laid-Open (JP-A) No. 2011-68819
Patent Document 3: Japanese Patent Application Laid-Open (JP-A) No. 2003-342343

DISCLOSURE OF THE INVENTION

Problem that the Invention is to Solve

The present invention has been achieved in view of the current status of the prior art as mentioned above. An object of the present invention is to provide a thermoplastic polyester elastomer resin foam molded product which exhibits light weight, excellent rebound resilience and excellent surface smoothness.

Means for Solving the Problem

In order to achieve the object, the inventors of the present invention have earnestly studied the configuration of a surface layer in a foam molded product of a thermoplastic polyester elastomer. As a result, the inventors have found that by controlling a foamed region of the surface layer and controlling cells to a specific size, a resin foam molded product having very high rebound resilience and excellent surface smoothness can be obtained. Further, the inventors have found that by applying a counter-pressure foam injection molding method in which a gas is infused into the cavity of a mold and a molten thermoplastic resin is injected under pressure, the good-quality polyester elastomer foam molded product can easily be produced and provided. That is, the inventors have found that the properties (such as melt tension, crystallization temperature, and gas retention) of thermoplastic polyester elastomers are suitable for the counter-pressure foam molding method, and the thermoplastic polyester elastomers can thus endure a step of applying and releasing the pressure of counter-pressure and enables acquisition of the objective foam molded product that is highly foamed and has surface smoothness. The present invention has thus been completed.

Thus, the present invention is constituted from the following (1) to (5).

(1) A foam molded product including a continuous phase formed of a resin component containing a thermoplastic polyester elastomer, wherein the thermoplastic polyester elastomer is prepared by bonding a hard segment and a soft segment, wherein the hard segment consists of polyester constituted from aromatic dicarboxylic acid and aliphatic and/or alicyclic diol as constituting components, wherein the soft segment is at least one member selected from a group consisting of aliphatic polyether, aliphatic polyester and aliphatic polycarbonate,
  wherein
    the foam molded product is constituted from, as a surface layer ranging from a surface of the foam molded product to a depth of 1000 μm, a surface layer consisting of only a foamed region in which a non-foamed portion having a cell density of 10% or less is not present, or
    the foam molded product has, as a surface layer ranging from a surface of the foam molded product to a depth of 1000 μm, a surface layer consisting of both a foamed region in which the non-foamed portion is present and a foamed region in which the non-foamed portion is not present, and wherein the foam molded product has a density of 0.01 to 0.70 g/cm³.

(2) The foam molded product according to (1), wherein the foamed region of the surface layer in which the non-foamed portion is not present has a flattened cell layer that includes cells having an average aspect ratio of 4.0 to 15.0.

(3) The foam molded product according to (1) or (2), wherein the foam molded product further has, in an inner layer deeper than the depth of 1000 μm from the surface, a circular cell layer that includes cells having an average aspect ratio of 1.0 to 2.0.

(4) A method for producing a foam molded product by using a counter-pressure foam injection molding method, wherein the method includes: infusing a pressure gas into a cavity of a mold after completely closing the mold; starting injection of a resin component containing a molten-state thermoplastic polyester elastomer together with a chemical foaming agent and/or an inert gas in a supercritical state when a gas pressure in the cavity reaches a prescribed pressure; and rapidly releasing the pressure gas immediately after filling 10 to 55% of a volume of the cavity with the resin component or after a prescribed time.

(5) The method for producing the foam molded product according to (4), wherein the inert gas in a supercritical state is nitrogen.

Effects of the Invention

The thermoplastic polyester elastomer resin foam molded product of the present invention is not only excellent in its light weight but also can achieve very high rebound resilience and excellent surface smoothness. Further, it exhibits a uniform foamed state, high heat resistance, high water resistance and high molding stability in spite of its high foaming ratio. Accordingly, the thermoplastic polyester elastomer resin foam molded product of the present invention can be applied even to parts which require high reliability. Further, by using the counter-pressure foam injection molding method, it is possible to acquire the foam molded product having the above-mentioned excellent properties and having any desired shape, simply by preparing a corresponding mold, without a need of post processing such as cutting.

BRIEF DESCRIPTION OF THE DRAWINGS

FIGS. 2(X) to 2(Z) are schematic views of a foam molded product (B) according to the present invention, where

FIGS. 3(X) to 3(Z) are schematic views of a foam molded product (A) according to the present invention, where

MODE FOR CARRYING OUT THE INVENTION

Hereinafter, the foam molded product of the present invention will be illustrated in detail.

[Thermoplastic Polyester Elastomer]

The thermoplastic polyester elastomer used in the present invention is prepared by bonding a hard segment and a soft segment. The hard segment comprises polyester. As to an aromatic dicarboxylic acid constituting the polyester of the hard segment, common aromatic dicarboxylic acid can be widely used and there is no particular limitation therefor. As to a main aromatic dicarboxylic acid, it is desirable to use terephthalic acid or naphthalenedicarboxylic acid (to be more specific, among isomers thereof, 2,6-naphthalenedicarboxylic acid is preferred). Content of the aromatic dicarboxylic acid as such is preferred to be 70 molar % or more, and more preferred to be 80 molar % or more, in the total dicarboxylic acids constituting the polyester of the hard segment. As to other dicarboxylic acid components, there are exemplified an aromatic dicarboxylic acid such as diphenyl dicarboxylic acid, isophthalic acid and 5-sodium sulfoisophthalate; an alicyclic dicarboxylic acid such as cyclohexanedicarboxylic acid and tetrahydrophthalic anhydride; and an aliphatic dicarboxylic acid such as succinic acid, glutaric acid, adipic acid, azelaic acid, sebacic acid, dodecan-dioic acid, dimer acid and hydrogenated dimer acid. They can be used within such an extent that they do not greatly lower a melting point of the resin. Content thereof is 30 molar % or less, preferably 20 molar % or less of the whole acid components.

Further, as to an aliphatic or alicyclic diol constituting the polyester of the hard segment in the thermoplastic polyester elastomer used in the present invention, common aliphatic or alicyclic diol can be widely used and there is no particular limitation therefor. Mostly, it is preferred to be an alkylene glycol having 2 to 8 carbons. To be more specific, there are exemplified ethylene glycol, 1,3-propylene glycol, 1,4-butanediol, 1,6-hexanediol and 1,4-cyclohexane-dimethanol. Among them, any of ethylene glycol and 1,4-butanediol is preferred.

As to the component constituting the polyester of the above hard segment, that which consists of a butylene terephthalate unit (a unit consisting of terephthalic acid and 1,4-butanediol) or that which consists of a butylene naphthalate unit (a unit consisting of 2,6-naphthalenedicarboxylic acid and 1,4-butanediol) is preferred in view of physical property, molding ability and cost performance.

Furthermore, when the aromatic polyester which is advantageous as the polyester constituting the hard segment in the thermoplastic polyester elastomer used in the present invention is previously produced and is then copolymerized with a component of the soft segment, the aromatic polyester as such can be easily produced in accordance with a common production method for polyester. Still further, the polyester as such is preferred to have a number-average molecular weight of from 10000 to 40000.

The soft segment of the thermoplastic polyester elastomer used in the present invention is at least one member selected from a group consisting of aliphatic polyether, aliphatic polyester and aliphatic polycarbonate.

As to the aliphatic polyether, there are exemplified poly (ethylene oxide) glycol, poly(propylene oxide) glycol, poly (tetramethylene oxide) glycol, poly(hexamethylene oxide)

glycol, poly(trimethylene oxide) glycol, a copolymer of ethylene oxide with propylene oxide, an adduct of poly (propylene oxide) glycol with ethylene oxide and a copolymer of ethylene oxide with tetrahydrofuran. Among them, poly(tetramethylene oxide) glycol and the adduct of poly (propylene oxide) glycol with ethylene oxide are preferred in view of elastic property.

As to the aliphatic polyester, there are exemplified poly (ε-caprolactone), polyenantho-lactone, polycaprylo-lactone and poly(butylene adipate). Among them, poly(ε-caprolactone) and poly(butylene adipate) are preferred in view of the elastic property.

The aliphatic polycarbonate is preferred to mainly consist of an aliphatic diol group having 2 to 12 carbons. As to the aliphatic diol as such, there are exemplified ethylene glycol, 1,3-propylene glycol, 1,4-butanediol, 1,5-pentanediol, 1,6-hexanediol, 1,8-octanediol, 2,2-dimethyl-1,3-propane-diol, 3-methyl-1,5-pentanediol, 2,4-diethyl-1,5-pentanediol, 1,9-nonanediol and 2-methyl-1,8-octanediol. An aliphatic diol having 5 to 12 carbons is preferred particularly in view of flexibility and low-temperature characteristics of the resulting thermoplastic polyester elastomer. Those components may be used either solely or jointly by combining two or more thereof if necessary depending upon the cases mentioned below.

As to the aliphatic polycarbonate-diol constituting the soft segment of the thermoplastic polyester elastomer used in the present invention having good low-temperature characteristics, that having a low melting point (such as 70° C. or lower) and a low glass transition temperature is preferred. An aliphatic polycarbonate-diol consisting of 1,6-hexanediol which is usually used in forming a soft segment of a thermoplastic polyester elastomer has a glass transition temperature of as low as about −60° C. and has a melting point of as low as about 50° C. Therefore, its low-temperature characteristics thereof are good. Besides the above, an aliphatic polycarbonate-diol prepared by copolymerization of the above aliphatic polycarbonate-diol with an appropriate amount of 3-methyl-1,5-pentanediol for example has somewhat higher glass transition point as compared with the starting aliphatic polycarbonate-diol but its melting point lowers or it becomes amorphous whereby it corresponds to an aliphatic polycarbonate-diol having good low-temperature characteristics. Moreover, in an aliphatic polycarbonate-diol consisting of, for example, 1,9-nonanediol and 2-methyl-1,8-octanediol, its melting point and glass transition temperature are as sufficiently low as about 30° C. and about −70° C., respectively whereby it corresponds to an aliphatic polycarbonate-diol having good low-temperature characteristics.

As to the soft segment of the thermoplastic polyester elastomer used in the present invention, an aliphatic polyether is preferred in view of solving the problems of the present invention.

The thermoplastic polyester elastomer used in the present invention is preferred to be a copolymer constituted from terephthalic acid, 1,4-butanediol and poly(tetramethylene oxide) glycol as main components. It is preferred that, in the dicarboxylic acid components constituting the thermoplastic polyester elastomer, terephthalic acid is 40 molar % or more, more preferred to be molar % or more, further preferred to be 80 molar % or more, and especially preferred to be 90 molar % or more. It is preferred that, in the glycol components constituting the thermoplastic polyester elastomer, a total amount of 1,4-butanediol and poly(tetramethylene oxide) glycol is 40 molar % or more, more preferred to be 70 molar % or more, further preferred to be 80 molar % or more, and especially preferred to be 90 molar % or more.

A number-average molecular weight of the above poly (tetramethylene oxide) glycol is preferred to be from 500 to 4000. When the number-average molecular weight is less than 500, elastomer characteristic property may be hardly achieved. On the other hand, when the number-average molecular weight is more than 4000, compatibility with the hard segment may lower whereby it may become difficult to be copolymerized into a block form. The number-average molecular weight of the above poly(tetramethylene oxide) glycol is more preferred to be not less than 800 and not more than 3000, and further preferred to be not less than 1000 and not more than 2500.

In the thermoplastic polyester elastomer used in the present invention, a content of the soft segment is preferred to be 25 to 90% by mass, more preferred to be 40 to 90% by mass, further preferred to be 55 to 90% by mass, and especially preferred to be 65 to 90% by mass. When the content of the soft segment is less than 25% by mass, crystallinity is high whereby the rebound resilience may be inferior while, when it is more than 90% by mass, crystallinity lowers too much whereby the foam moldability may be inferior.

The thermoplastic polyester elastomer used in the present invention can be produced by known methods. For examples, there are a method wherein a lower alcohol diester of dicarboxylic acid is subjected to a transesterification with an excessive amount of low-molecular glycol and a soft segment component in the presence of a catalyst and the resulting reaction product is subjected to a polycondensation; a method wherein a dicarboxylic acid is subjected to an esterification with an excessive amount of glycol and a soft segment component in the presence of a catalyst and the resulting reaction product is subjected to a polycondensation; a method wherein polyester of a hard segment is previously produced and a soft segment component is added thereto followed by randomizing by means of a transesterification; a method wherein a hard segment and a soft segment are connected using a chain linking agent; and, when poly(ε-caprolactone) is used as a soft segment, a method wherein an ε-caprolactone monomer is subjected to an addition reaction to a hard segment. Any of those methods may be used.

[Resin Component Containing a Thermoplastic Polyester Elastomer]

In the present invention, a crosslinking agent or an additive described below may be blended in the thermoplastic polyester elastomer. A composition containing the thermoplastic polyester elastomer together with these optional components such as a crosslinking agent and an additive is called "a resin component containing a thermoplastic polyester elastomer" in the present invention, but sometimes abbreviated as "a thermoplastic polyester elastomer resin". The resin component preferably contains 80% by mass or more of the thermoplastic polyester elastomer, more preferably contains 90% by mass or more, further preferably contains 95% by mass or more, and may contain 100% by mass of the thermoplastic polyester elastomer.

A cross-linking agent may be blended in the thermoplastic polyester elastomer upon necessity within such an extent that the effect of the present invention is not inhibited thereby. As to the cross-linking agent as such, there is no particular limitation so far as it is a cross-linking agent which reacts with hydroxyl group or carboxyl group in the thermoplastic polyester elastomer. Examples thereof are epoxy-type cross-linking agent, carbodiimide-type crosslinking agent, isocyanate-type cross-linking agent, acid anhydride-type cross-linking agent, silanol-type cross-linking agent, melamine resin-type cross-linking agent, metal salt-type cross-linking agent, metal chelate-type cross-linking agent and amino resin-type cross-linking agent. Incidentally, the cross-linking agent may be used either solely or jointly by combining two or more thereof.

Using amount (content) of the cross-linking agent is appropriately adjusted depending upon an extrusion condition, a desired foaming ratio, etc. For example, it is preferred to be 0.1 to 4.5 part(s) by mass, more preferred to be 0.1 to 4 part(s) by mass, and further preferred to be 0.1 to 3 part(s) by mass to 100 parts by mass of the thermoplastic polyester elastomer.

Further, various additives, fillers, and other polymers other than the above cross-linking agent may be blended in the thermoplastic polyester elastomer used in the present invention depending upon the object. A type of the additives is not particularly limited but various types of additives which are commonly used for the foam molding can be used. To be more specific, examples of the additives are known antioxidant (of hindered phenol-type, sulfur-type, phosphorus-type, amine-type, etc.), light stabilizer (of hindered amine-type, benzotriazole-type, benzophenone-type, benzoate-type, triazole-type, nickel-type, salicylic-type, etc.), ultraviolet absorber, lubricant, crystal nucleating agent, filler, flame retardant, flame retardant aid, releasing agent, antistatic agent, molecule adjusting agent (such as a peroxide), metal inactivating agent, organic and inorganic nucleating agent, neutralizing agent, antacid, antibacterial agent, fluorescent bleaching agent and organic and inorganic pigment or dye as well as organic and inorganic phosphorus compound used for imparting flame retardancy and thermal stability. Blending amount (content) of the additives, fillers, and other polymers may be appropriately selected within such an extent that it does not deteriorate formation of foams, etc. and the blending amount (content) being usually used for the molding of thermoplastic resin may be adopted.

As to a method for determining the composition and the composition ratio of the thermoplastic polyester elastomer used in the present invention, it is possible to use calculation based on the integral ratio of protons in $^1$H-NMR measured using a sample dissolved in a solvent such as deuterated chloroform.

In order to suitably obtain the foam molded product according to the present invention, the thermoplastic polyester elastomer resin used in the present invention preferably has an MFR (melt flow rate) of 5 to 40 g/10 min when the MFR is measured at a load of 2,160 g and a measurement temperature of 230° C. according to the measuring method described in ASTM D1238. The MFR is more preferably 10 to 30 g/10 min.

[Foam Molded Product]

The foam molded product according to the present invention can be obtained using the polyester elastomer resin and obtained without any post processing such as cutting. That is, the molded product does not have any cut surface. The cut surface referred to in this case means a surface obtained by cutting a non-foamed skin layer or the like from a foam molded product and does not mean a surface generated by removing an unnecessary portion, such as a gate portion, derived from a mold.

The foam molded product according to the present invention is a foam molded product (A) which is constituted from, as a surface layer ranging from a surface of the foam molded product to a depth of 1000 μm, a surface layer consisting of only a foamed region in which a non-foamed portion having a cell density of 10% or less is not present (hereafter, it may be abbreviated as surface layer (A)), or the foam molded product (B) which has, as a surface layer ranging from a surface of the foam molded product to a depth of 1000 μm, a surface layer consisting of both a foamed region in which the non-foamed portion is present and a foamed region in which the non-foamed portion is not present (hereafter, it may be abbreviated as surface layer (B)). The surface layer referred to herein means a surface layer consisting of a single surface. In the cases of, for example, the foam molded product having a rectangular parallelepiped shape, it has six surface layers, and a surface layer therefore means one of the six surface layers. In the cases of the foam molded product having a rectangular parallelepiped shape, in the foam molded product (A), all of six surfaces consist of the surface layers (A), whereas in the foam molded product (B), at least one surface consists of the surface layer (B). A foam molded product that is produced by a so-called core-back foam injection molding method and has a non-foamed skin layer has a rectangular parallelepiped shape, wherein an upper surface and a lower surface consist of only the foamed region in which the non-foamed portion is present, and wherein side surfaces consist of only the foamed region in which the non-foamed portion is not present. According to the above definition, such foam molded product does not correspond to the foam molded product (B). In the total area of a single surface of the foam molded product (B), the area of the foamed region in which the non-foamed portion is present is preferably 60% or less, more preferably 50% or less, and further preferably 30% or less. A foam molded product having an area of 0% for the foamed region in which the non-foamed portion is present is the foam molded product (A). In the foam molded product (B), the proportion of the area of the foamed region in which the non-foamed portion is present to the total surface area of the foam molded product is preferably 50% or less, more preferably 40% or less, and further preferably 25% or less. The foam molded product (A) has improved rebound resilience because the non-foamed portion including no cell is not present in any surface layer. In the foam molded product (B), the foamed region in which the non-foamed portion is present includes less cells and therefore has low rebound resilience, whereas the foamed region in which the non-foamed portion is not present has high rebound resilience. Therefore, the foam molded product (B) can have, as one foam molded product, different rebound resilience levels depending on location. The surface of the molded product according to the present invention does not necessarily need to be a flat surface, and may be a curved surface or a surface including projections or the like. One point of the present invention is that it is possible to obtain a foam molded product having any desired shape by preparing a mold corresponding to the shape.

The non-foamed portion means a phase that hardly includes cells and is formed of the thermoplastic polyester elastomer resin, and is a portion having a cell density of 10% or less. Here, the cell density is calculated through image processing of a cross-sectional photograph of a cross-sectional-observation sample in the surface layer of the foam molded product obtained by using a scanning electron microscope. Specifically, the calculation is done as described in the section of Examples. In the foam molded product according to the present invention, a portion not corresponding to the non-foamed portion is called a foamed portion or a foamed layer. The surface of the foamed portion consists of a very thin resin layer (so-called thin skin) formed by contact of an unfoamed molten resin or a foamed molten resin with the surface of a mold. The thickness of the resin layer is 50 μm or less. In the present invention, whether a portion corresponds to "the non-foamed portion having a cell density of 10% or less" is judged by measuring a region of 200 μm×200 μm. Accordingly, the thin resin layer on the surface of the foamed portion does not correspond to "the non-foamed portion having a cell density of 10% or less".

The foam molded product according to the present invention does not have a sandwich structure in which the non-foamed layer is entirely provided on both sides of the foamed layer (in other words, a structure in which the foamed layer is, from both sides thereof, sandwiched between the non-foamed layers). The foam molded product according to the present invention is the foam molded product (A) or the foam molded product (B) described above. The foam molded product (A) is, in another expression, a foam molded product having no non-foamed layer and singly consisting of the foamed layer. The foam molded product (B) is, in another expression, a foam molded product in which the non-foamed portion (non-foamed skin layer) is present in only a part of a surface of the foam molded product. The size of the foam molded product according to the present invention is not particularly limited, and the foam molded product having any desired size can be obtained as long as a mold thereof can be manufactured.

In the present invention, cells having an aspect ratio of 2.0 or less are considered to be circular cells, whereas cells having an aspect ratio of more than 2.0 are considered to be flattened cells.

In the foam molded product according to the present invention, a flattened cell layer that includes cells have a large average aspect ratio is preferably present in the foamed region of the surface layer in which the non-foamed portion is not present. By increasing the aspect ratio of the flattened cells in the surface layer, the surface of the foam molded product becomes smooth and thus has excellent appearance. The flattened cell layer therefore preferably has an average aspect ratio of 4.0 to 15.0. When the flattened cell layer has an average aspect ratio of less than 4.0, unevenness may be generated on the surface of the molded product and the surface smoothness tends to be impaired. When the flattened cell layer has an average aspect ratio of more than 15.0, unevenness may be generated on the surface of the molded product and the surface smoothness tends to be impaired because cells are stretched and thereby broken. In order to achieve excellent surface smoothness, the flattened cell layer more preferably has an average aspect ratio of 4.0 to 10.0. Further, a circular cell layer that includes cells having a small average aspect ratio is preferably present in an inner layer deeper than 1000 μm from the surface. By decreasing the aspect ratio of the circular cells in the inner layer, the rebound resilience is improved. The circular cell layer therefore preferably has an average aspect ratio of 1.0 to 2.0. When the circular cell layer has an average aspect ratio of more than 2.0, the rebound resilience tends to be decreased. A reason why the cells in the surface layer are formed as flattened cells is because the resin component flows along the surface of a mold during the foam molding. In a preferred aspect of the foam molded product according to the present invention, the foamed region of the surface layer in which the non-foamed portion is not present preferably has the flattened cell layer that includes cells having an average aspect ratio of 4.0 to 15.0, and the inner layer deeper than 1000 μm from the surface has the circular cell layer that includes cells having an average aspect ratio of 1.0 to 2.0.

The foamed layer includes a resin continuous phase and independent cells. Here, the resin continuous phase means a portion having no hollow and formed of the resin component that contains the cured thermoplastic polyester elastomer. The properties of the cells differ depending on the size thereof as long as the diameter of the cells (cell diameter) is uniform and is not various. In order to exert high rebound resilience, a smaller cell diameter is advantageous. Specifically, an average cell diameter of 10 to 400 μm is preferable. When the average cell diameter is less than 10 μm, the molded product has a low internal pressure and tends to deteriorate the appearance such as a sink mark. On the other hand, when the average cell diameter is more than 400 μm, the molded product has low load bearing and tends to decrease the rebound resilience. The average cell diameter is more preferably 100 to 400 μm, and further preferably 200 to 400 μm.

Density of the foam molded product of the present invention is preferred to be 0.01 to 0.70 g/cm$^3$. Density of a common polyester elastomer is about 1.0 to 1.4 g/cm$^3$. Accordingly, it can be said that the foam molded product of the present invention has sufficiently light weight. Density of the foam molded product of the present invention is more preferred to be 0.1 to 0.60 g/cm$^3$, further preferred to be 0.1 to 0.45 g/cm$^3$, and particularly preferred to be 0.1 to 0.35 g/cm$^3$. When the density is less than 0.01 g/cm$^3$, sufficient strength may not be achieved and mechanical strength may become inferior while, when it is more than 0.70 g/cm$^3$, rebound resilience may become inferior.

The foam molded product according to the present invention not only is excellent in lightness but also exerts a very high rebound resilience and has excellent surface smoothness. Further, the foam molded product according to the present invention has a uniformly foamed state despite its high foaming ratio, high heat resistance, water resistance, and molding stability, and can therefore be provided as a polyester-based foam molded product applicable to components that require high reliability. Accordingly, the foam molded product according to the present invention is, for example, usable in the applications described below. The application of the foam molded product according to the present invention, however, is not limited to the following applications.

Examples of the applications include vehicle materials, civil engineering products, building products, home electrical appliances, office automation equipment, sporting goods, stationery products, toys, medical products, food containers, and agricultural materials. Specific examples include vehicle mechanical members, engine components, vehicle exterior materials, vehicle interior materials, cushion materials, sealing materials, car seats, deadenings, door trims, sun visors, vehicle damping materials, acoustic materials, and insulating materials (thermal materials), vibration-proofing materials, buffer materials, civil engineering joints, icicle prevention panels, protection materials, lightweight soil, earth fill, artificial soil, tatami cores, building insulating materials, building joint materials, clearance-closing members, building protection materials, reflective materials, industrial trays, tubes, pipe covers, air-conditioner insulation pipes, gasket cores, concrete formworks, televisions, freezer refrigerators, cooking equipment, washing machines, air conditioners, lighting apparatuses, computers, magnet optical disks, copying machines, fax machines, printers, shoes, protectors, gloves, and sporting equipment.

[Production Method of the Foam Molded Product]

Figure 1:
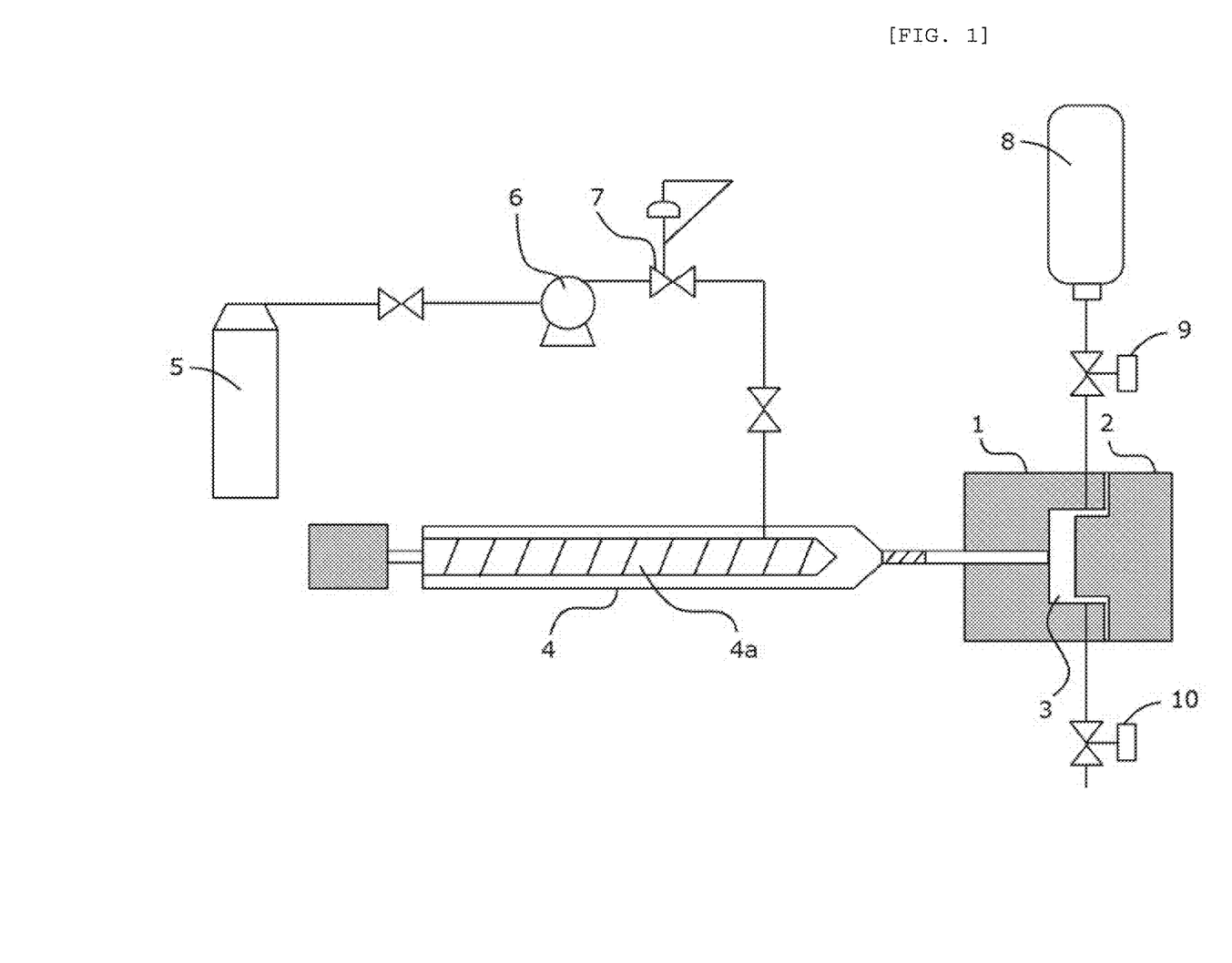
FIG. 1 is a schematic constituting drawing for illustrating an example of a method for producing the foam molded product of the present invention.

Although there is no particular limitation for a foaming method of the foam molded product of the present invention, a preferred one is such a method wherein a thermoplastic polyester elastomer resin is impregnated with a gas of high pressure and, after that, the pressure is reduced (by releasing the pressure). Particularly, as to a molding method for achieving a uniform foaming and good molding cycle and low cost, a counter-pressure foam injection molding method is preferable in which a gas is infused into the cavity of a mold and a molten thermoplastic polyester elastomer resin is injected under pressure, when a melt mixture of a foaming agent and the thermoplastic polyester elastomer resin is subjected to an injection molding. Specifically, as illustrated in FIG. 1, a pressure nitrogen gas is infused into a cavity 3 formed between a plurality of molds 1 and 2 that are closed, using a counter-pressure device 8 so as to apply a prescribed pressure and thus achieve a pressurized state. Then, a molten-state thermoplastic polyester elastomer resin is, together with a chemical foaming agent and/or an inert gas in a supercritical state (hereinafter, sometimes collectively called a "foaming agent"), injected into the cavity. Then, the gas applied to the cavity by counter-pressure is rapidly released from an electromagnetic valve 10 immediately after completion of the filling of the resin or after a prescribed time, thereby the thermoplastic polyester elastomer resin is foamed. The prescribed pressure is preferably 0.01 MPa to 29.0 MPa. The pressure referred to herein is gauge pressure. The prescribed time is preferably 1 to 60 seconds. Here, the above method can be combined with a core-back foam injection molding method which obtains a foam molded product by moving one mold 2 in the mold opening direction so as to enlarge the volume of the cavity 3, immediately before the rapid release of the gas applied to the cavity by counter pressure, or at the same time as the release of the gas, or immediately after the release of the gas, or after a prescribed time after the release of the gas.

The thermoplastic polyester elastomer resin and the foaming agent can be mixed in advance in a plasticizing region 4a of an injection molding machine 4 before filled into the cavity 3. By appropriately adjusting the gas pressure of counter-pressure and the filling amount of the resin depending on the material when foam molding is performed as described above, a foam molded product having an aimed foaming ratio and rebound resilience can be obtained. The gas pressure of counter-pressure affects the fineness of cells and the foaming ratio. With even low pressure applied to the cavity, the depressurization rate is improved and high foaming can thus be achieved. On the other hand, with high pressure applied, a gas generated by the foaming agent is prevented from being released from the resin and cells thereby tend to be fine. With excessively high gas pressure applied, however, the foam moldability tends to be poor. Therefore, the pressure of counter-pressure is preferably 0.01 MPa to 29.0 MPa, more preferably 0.05 MPa to 15.0 MPa, and further preferably 0.5 MPa to 10.0 MPa. The pressure referred to herein is gauge pressure. When the filling amount of the resin is large, the foaming ratio is low. When the filling amount is small, the foaming ratio is high and the rebound resilience is high. Therefore, the filling amount of the resin is preferably 10% to 55%, more preferably 10% to 50%, further preferably 10% to 40%, and particularly preferably 10% to 30% of the volume of the cavity. Foam molding under the conditions described above can give a foam molded product that is light weight and has a high rebound resilience.

Figure 2:
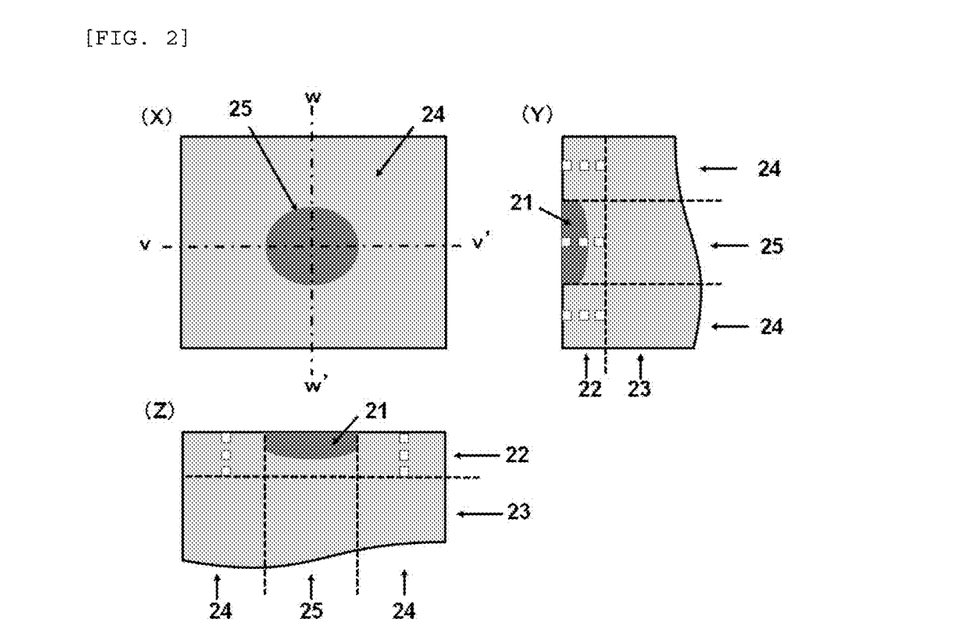
FIG. 2(X) is a surface view.
FIG. 2(Y) is a cross-sectional view cut along a surface w-w'.
FIG. 2(Z) is a cross-sectional view cut along a surface v-v'.
Figure 3:
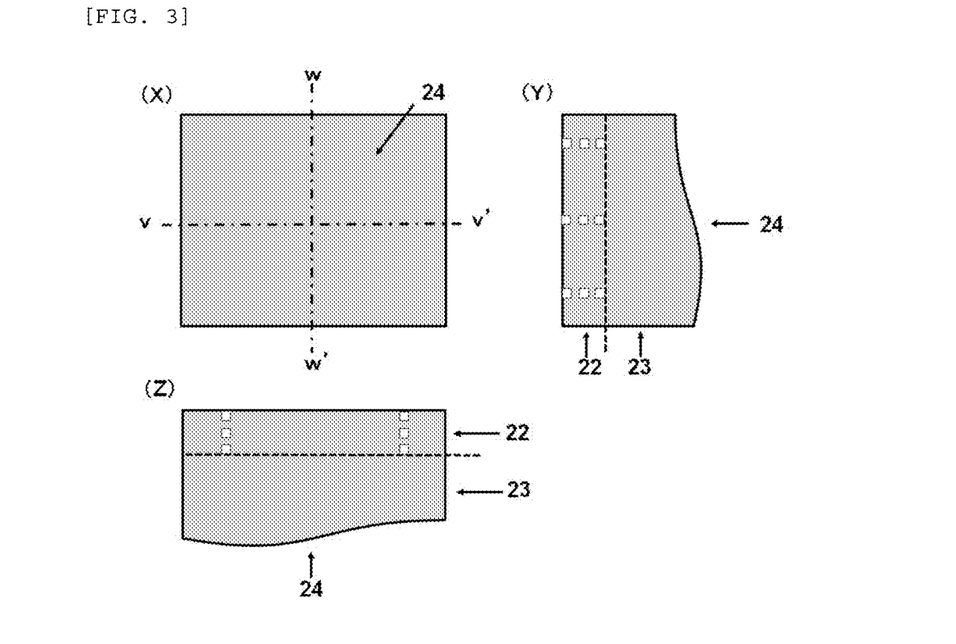
FIG. 3(X) is a surface view.
FIG. 3(Y) is a cross-sectional view cut along a surface w-w'.
FIG. 3(Z) is a cross-sectional view cut along a surface v-v'.

Described below is a reason why the foam molded product according to the present invention is the foam molded product (A) or the foam molded product (B) described above. FIGS. 2(X) to 2(Z) show a schematic structure of the foam molded product (B). In the foam molded product (B), a foamed region 25 in which a non-foamed portion 21 is present is observed. On the contrary, the foam molded product (A) has a structure including no foamed region 25 and consisting of only a foamed region 24 in which the non-foamed portion 21 is not present. As described above, a molten-state thermoplastic polyester elastomer resin is, together with a foaming agent, filled into the cavity of a mold pressurized by counter-pressure to the extent of 10% to 55% of the volume of the cavity. In this process, a part of the molten resin contacts with the mold and is cooled, thereby forming the non-foamed portion. Thereafter, the thermoplastic polyester elastomer resin is foamed by releasing the pressure in the cavity and thus a foam molded product is obtained. The non-foamed portion, however, is left in a part of a surface layer of the foam molded product, and thus the foam molded product (B) is obtained. On the other hand, when the molten resin does not contact with the mold in the filling, or when the molten resin contacts only with a very small area of the mold, or when the pressure in the cavity is released before the molten resin in contact with the mold is fully cooled, the foam molded product (A) in which the non-foamed portion is not formed in any surface layer is obtained. Meanwhile, flattened cells are formed near the surface of the foamed region of the surface layer in which the non-foamed portion is not present because the thermoplastic polyester elastomer resin flows along the surface of the mold when foamed.

A chemical foaming agent which can be used for producing the foam molded product of the present invention is added to the resin melted in a resin melting zone of the molding machine, so as to act as a gas component which becomes a foaming nucleus or as a generating source thereof.

To be more specific, an inorganic compound such as ammonium carbonate, sodium bicarbonate, and azide compound, an organic compound such as azo compound, sulfohydrazide compound, and nitroso compound, etc. can be used as the chemical foaming agent. As to the above azide compound, there are exemplified terephthalazide and p-tert-butylbenzazide. Further, as to the above azo compound, there are exemplified diazocarbonamide (ADCA), 2,2-azoiso-butyronitrile, azohexahydrobenzonitrile and diazo-amino-benzene. Among them, ADCA is preferred and is practically used. As to the above sulfohydrazide compound, there are exemplified benzene sufohydrazide, benzene 1,3-disulfohydrazide, diphenylsulfone 3,3-disulfone hydrazide and diphenyl oxide 4,4-disulfone hydrazide. As to the above nitroso compound, there is exemplified N,N-dinitrosopentaethylene tetramine (DNPT).

When the chemical foaming agent is used as a foaming agent, the chemical foaming agent also can be used as a foaming agent master batch which contains a thermoplastic resin having lower melting point than a decomposing temperature of the chemical foaming agent as a base material, in order to uniformly disperse in the thermoplastic polyester elastomer resin. As to the thermoplastic resin to be used as a base, there is no particular limitation so far as its melting point is lower than the decomposing temperature of the chemical foaming agent. Examples thereof are polystyrene (PS), polyethylene (PE) and polypropylene (PP). In that case, the compounding ratio of the chemical foaming agent to the thermoplastic resin is preferred to be from 10 to 100 parts by mass of the chemical foaming agent to 100 parts by mass of the thermoplastic resin. When the chemical foaming agent is less than 10 parts by mass, the amount of the master batch to the thermoplastic polyester elastomer resin becomes too much whereby the physical property may be lowered. When the chemical foaming agent is more than 100 parts by mass, it is difficult to make into the master batch in view of a problem of dispersibility of the chemical foaming agent.

When the inert gas in a supercritical state is used as the foaming agent, carbon dioxide and/or nitrogen can be used as the inert gas. When carbon dioxide and/or nitrogen in a supercritical state are/is used as the foaming agent, an amount thereof to 100 parts by mass of the thermoplastic polyester elastomer resin is preferred to be from 0.05 to 30 part (s) by mass, and more preferred to be from 0.1 to 20 part (s) by mass. When carbon dioxide and/or nitrogen in a supercritical state are/is less than 0.05 part by mass, uniform and fine foamed cell is hardly obtained while, when it is more than 30 parts by mass, appearance of a surface of the molded product tends to be deteriorated.

Although carbon dioxide or nitrogen in a supercritical state used as the foaming agent can be used solely, it is also possible to use a mixture of carbon dioxide and nitrogen. Nitrogen tends to be suitable for forming finer cell for the thermoplastic polyester elastomer resin. On the other hand, carbon dioxide can make an infusion amount of the gas relatively more and suitable for achieving the higher foaming ratio. Therefore, nitrogen and carbon dioxide can be freely mixed depending upon the adjusted state of the foamed structure body. The mixing ratio upon mixing is preferred to be within a range of from 1:9 to 9:1 in molar ratio.

As to the foaming agent used in the present invention, nitrogen in a supercritical state is more preferred in view of obtaining the uniform fine foam.

When the thermoplastic polyester elastomer resin in a molten-state is injected into the cavity 3 together with the foaming agent, the thermoplastic polyester elastomer resin in a molten-state and the foaming agent may be mixed in the plasticizing region 4a of the injection molding machine 4. Particularly when carbon dioxide and/or nitrogen in a supercritical state are/is used as the foaming agent, it is possible to adopt a method wherein, as shown in FIG. 1 for example, carbon dioxide and/or nitrogen in a gaseous state from a gas bomb 5 are/is compressed either directly or with a pressure-raising pump 6 and infused into the injection molding machine 4. It is necessary that carbon dioxide and/or nitrogen as such are/is in a supercritical state in an inner part of the molding machine in view of solubility, permeability and diffusing property into the polyester elastomer resin composition in a molten-state.

Hereinabove, the supercritical state is such a state wherein a discrimination between a gas phase and a liquid phase becomes nil under a specific temperature region and a specific pressure region as a temperature and a pressure of a substance resulting the gas phase and the liquid phase are increased. The temperature and the pressure at that time are called the critical temperature and the critical pressure, respectively. Thus, a substance in a supercritical state has characteristics of both gas and liquid. Accordingly, a fluid resulted in this state is called a critical fluid. As compared with a gas, the critical fluid as such has high density and, as compared with a liquid, it has low viscosity. Therefore, the critical fluid has such a characteristic property that it is very easily diffusible in a substance.

EXAMPLES

In order to demonstrate the effects of the present invention, Examples will be shown below although the present invention shall not be limited at all by those Examples.

In the Examples and Comparative Examples, following materials were used.
Thermoplastic Polyester Elastomer;
(Polyester Elastomer A)

In accordance with a method mentioned in Japanese Patent Application Laid-Open (JP-A) No. 59491/97, a thermoplastic polyester elastomer containing 76% by mass of a soft segment was prepared using dimethyl terephthalate, 1,4-butanediol and poly(tetramethyleneoxide) glycol having a number-average molecular weight of 2000 as starting materials. This thermoplastic polyester elastomer was designated as a polyester elastomer A.
(Polyester Elastomer B)

In accordance with a method mentioned in Japanese Patent Application Laid-Open (JP-A) No. 59491/97, a thermoplastic polyester elastomer containing 83% by mass of a soft segment was prepared using dimethyl terephthalate, 1,4-butanediol and poly(tetramethyleneoxide) glycol having a number-average molecular weight of 2000 as starting materials. This thermoplastic polyester elastomer was designated as a polyester elastomer B.
(Polyester Elastomer C)

In accordance with a method mentioned in Japanese Patent Application Laid-Open (JP-A) No. 59491/97, a thermoplastic polyester elastomer containing 67% by mass of a soft segment was prepared using dimethyl terephthalate, 1,4-butanediol and poly(tetramethyleneoxide) glycol having a number-average molecular weight of 1000 as starting materials. This thermoplastic polyester elastomer was designated as a polyester elastomer C.
(Polyester Elastomer D)

In accordance with a method mentioned in Japanese Patent Application Laid-Open (JP-A) No. 59491/97, a thermoplastic polyester elastomer containing 55% by mass of a soft segment was prepared using dimethyl terephthalate, 1,4-butanediol and poly(tetramethyleneoxide) glycol having a number-average molecular weight of 1000 as starting materials. This thermoplastic polyester elastomer was designated as a polyester elastomer D.
(Polyester Elastomer E)

In accordance with a method mentioned in Japanese Patent Application Laid-Open (JP-A) No. 59491/97, a thermoplastic polyester elastomer containing 28% by mass of a soft segment was prepared using dimethyl terephthalate, 1,4-butanediol and poly(tetramethyleneoxide) glycol having a number-average molecular weight of 1000 as starting materials. This thermoplastic polyester elastomer was designated as a polyester elastomer E.
Cross-Linking Agent;
(Styrene-Type Copolymer): Epoxy-Type Cross-Linking Agent A pressurizing reactor of a stirring tank type of one-liter volume equipped with an oil jacket was provided. Temperature of the oil jacket was kept at 200° C. On the other hand, a mixed solution of monomers consisting of 89 parts by mass of styrene (St), 11 parts by mass of glycidyl methacrylate (GMA), 15 parts by mass of xylene (Xy) and 0.5 part by mass of di-tert-butyl peroxide (DTBP) as a polymerization initiator was placed in a material tank. This solution was continuously supplied from the material tank to the reactor with a constant supplying speed (48 g/min., retention time: 12 minutes), and then a reaction solution was continuously discharged from an outlet of the reactor so as to keep an amount of an inner liquid in the reactor constant (about 580 g). Inner temperature of the reactor at that time was kept at about 210° C. After 36 minutes from a stage wherein the inner temperature of the reactor became stable, the discharged reaction solution was introduced into a film distillation machine kept at 30 kPa of vacuum degree and 250° C. of temperature so as to continuously remove evaporated components whereupon a styrene-type copolymer was obtained. According to GPC analysis (value being calculated as polystyrene), this styrene-type copolymer had a mass-average molecular weight of 8500 and a number-average molecular weight of 3300. Further, its epoxy value was 670 equivalents/1×10$^6$ g and its epoxy value number (a number of average epoxy groups per molecule) was 2.2. This styrene-type copolymer had two or more glycidyl groups in a molecule.

[Resin Component Containing Thermoplastic Polyester Elastomer (Thermoplastic Polyester Elastomer Resin)]

Polyester elastomers A, B, C, D and E prepared above were used as they are.

The styrene-type copolymer was melted and kneaded with 100 parts by mass of the polyester elastomer A according to a compounding composition mentioned in Table 1 using a biaxial screw extruder followed by making into pellets so as to give pellet of A'. Physical properties of each of the thermoplastic polyester elastomer resins were measured by the method which will be mentioned later. Results thereof are shown in Table 1.

[MFR]

MFR (melt flow rate) of the thermoplastic polyester elastomer resin was measured in accordance with a measuring method mentioned in ASTM D1238 wherein a load was 2,160 g and a measuring temperature was 230° C.

width of 360 mm and a length of 190 mm) into the cavity of the mold having the surface temperature thereof adjusted to 50° C. The thermoplastic polyester elastomer resin was foamed by rapidly releasing the nitrogen gas used for pressurization by counter-pressure immediately after the filling, and a foam molded product was thus obtained.

In Comparative Example 1, the pressure of counter-pressure was set to 0. In this case, the molding method is considered as a short-shot foam injection molding method.

Comparative Example 3

A foam molded product was produced by a mold expansion method (core-back foam injection molding method). Used as a mold was a plate-producing mold consisting of a fixed mold and a movable mold. The plate-producing mold is capable of forming a cavity with a width of 360 mm, a length of 190 mm, and a thickness of 3.0 mm when closed, and is capable of forming a cavity with the same width, the same length, and a thickness of 3.0 mm+the core-backed distance (mm) when the core is backed in the mold opening direction. Specifically, nitrogen in a supercritical state was infused in a plasticizing region of an electric injection molding machine that had a mold closing force of 10000 kN and provided with a screw having a screw diameter of 60 mm and a screw stroke of 300 mm. The resin was injected and filled into the mold having the surface temperature thereof adjusted to 50° C., so as to fully pack the mold. Then, at the stage in which a non-foamed skin layer of about 700

TABLE 1

|  |  |  | Thermoplastic polyester elastomer resin | | | | | |
|---|---|---|---|---|---|---|---|---|
|  |  |  | A | A' | B | C | D | E |
| Polyester elastomer | A | Part(s) by mass | 100 | 100 |  |  |  |  |
|  | B | Part(s) by mass |  |  | 100 |  |  |  |
|  | C | Part(s) by mass |  |  |  | 100 |  |  |
|  | D | Part(s) by mass |  |  |  |  | 100 |  |
|  | E | Part(s) by mass |  |  |  |  |  | 100 |
| Cross-linking agent | Styrene-type copolymer | Part(s) by mass | 0 | 2 | 0 | 0 | 0 | 0 |
| Content of soft segment |  | % by mass | 76 | 76 | 83 | 67 | 55 | 28 |
| MFR |  | g/10 min | 26 | 12 | 27 | 26 | 22 | 20 |

Examples 1 to 10 and Comparative Examples 1 and 2

Next, a foam molded product was produced using the thermoplastic polyester elastomer resin obtained above by the counter-pressure method described above. A mold was used that had a mold closing force of 10000 kN and formed a cavity with a width of 360 mm, a length of 190 mm, and a thickness of 15.0 mm when closed. A nitrogen gas having the pressure (pressure of counter-pressure) shown in Table 2 was infused into the cavity of this mold using counter-pressure. Nitrogen in a supercritical state was infused into a molten-state thermoplastic polyester elastomer resin in a plasticizing region of an electric injection molding machine provided with a screw having a screw diameter of 60 mm and a screw stroke of 300 mm. The resin was short-shot injected and filled at the resin amount shown in Table 2 (the filling amount of the resin relative to the volume of the cavity) from a gate (central portion of the surface with a Jim thickness was formed by external injection pressure and internal foaming pressure, the movable mold was moved by 12.0 mm in the mold opening direction so as to expand the volume of the cavity, and a foam molded product was thus obtained.

The foam molded products prepared in Examples 1 to 10 and Comparative Examples 1 to 3 were subjected to the following evaluations. Results are shown in Table 2.

[Configuration of Foam Molded Product]

The surface of the foam molded product was observed by visual inspection. It was estimated whether a non-foamed portion was present, from the presence or absence of an uneven portion (sink mark) caused by molding contraction and the generation of a pit. When the foam molded product was estimated as having a non-foamed portion due to the presence of an uneven portion and/or a pit, the foam molded product was cut along a cross-section (w-w' cross-section in FIG. 2(X)) in which the non-foamed portion was in the center, and used as a cross-sectional-observation sample.

Then, the foam molded product was further cut along another cross-section (v-v' cross-section in FIG. 2(X)) perpendicular to the first cut cross-section and used as a cross-sectional-observation sample. When the foam molded product was estimated as having no non-foamed portion due to the absence of an uneven portion and a pit, the foam molded product was cut along the center cross-section (w-w' cross-section in FIG. 3(X)) of the foam molded product and used as a cross-sectional-observation sample. Then, the foam molded product was further cut along another cross-section (v-v' cross-section in FIG. 3(X)) perpendicular to the first cut cross-section and used as a cross-sectional-observation sample.

A cross-sectional photograph of a surface layer of the foam molded product (cross-sectional-observation sample) was captured with scanning electron microscope SU1510 manufactured by Hitachi High-Technologies Corporation. Through image processing of the cross-sectional photograph, the cell density was calculated by the following formula in a 200 μm×200 μm region of the surface layer ranging from the surface of the foam molded product to a depth of 1000 μm, and the portion having a cell density of 10% or less was defined as the non-foamed portion.

Cell density (%)=[(total area of cells(μm$^2$))/40,000 (μm$^2$)]×100

In the case of the foam molded product estimated as having the non-foamed portion, the 200 μm×200 μm observation region was, for the measurement, set at five locations each around the surface, around a depth of 500 μm, and around a depth of 1000 μm (depths represented by white squares in a surface layer 22 of FIGS. 2(Y) and 2(Z)) in the surface layer ranging from the surface to a depth of 1000 μm. In the case of the foam molded product estimated as not having the non-foamed portion, the 200 μm×200 μm observation region was, for the measurement, set at five locations each around the surface, around a depth of 500 μm, and around a depth of 1000 μm (depths represented by white squares in a surface layer 22 of FIGS. 3(Y) and 3(Z)) in the surface layer ranging from the surface to a depth of 1000 μm. When all the three locations in the depth direction from the surface were determined to have no non-foamed portion by this measurement, the region was determined to be a region consisting of only a foamed region in which the non-foamed portion was not present.

The presence or absence of the non-foamed portion was thereby determined, and the foam molded products were sorted into three categories, i.e., a foam molded product (A) that is constituted from a surface layer consisting of only a foamed region in which a non-foamed portion is not present; a foam molded product (B) that has a surface layer consisting of both a foamed region in which the non-foamed portion is present and a foamed region in which the non-foamed portion is not present; and a foam molded product (C) that has a surface layer consisting of only a foamed region in which a non-foamed portion (non-foamed skin layer) is present.

[Proportion of Area of Foamed Region in which Non-Foamed Portion is Present]

As to a surface layer (B) of the foam molded product (B), the foamed region in which the non-foamed portion is present was identified through observation by visual inspection or from the cross-sectional photograph. Then, the proportion of the area thereof in relation to the area of the surface of the foam molded product was calculated by the following formula. When the foam molded product (B) has a plurality of surfaces corresponding to the surface layer (B), a larger proportion is used.

Proportion (%) of area of foamed region in which non-foamed portion is present=[(area(mm$^2$) of foamed region in which non-foamed portion is present)/(area(mm$^2$) of surface of foam molded product)]×100

[Proportion of Area of Foamed Region in which Non-Foamed Portion is Present in Relation to Total Surface Area]

Similarly to the method in "Proportion of area of foamed region in which non-foamed portion is present", "the area of the foamed region in which the non-foamed portion is present" was determined. When there were a plurality of surfaces corresponding to the surface layer (B) in the foam molded product (B), "the areas of the foamed regions in which the non-foamed portion is present" of all the surfaces were totaled. By the following formula was calculated the proportion of the area of the foamed region in which the non-foamed portion was present in relation to the total surface area of the foam molded product (B).

Proportion (%) of area of foamed region in which non-foamed portion is present in relation to total surface area=[(area(mm$^2$) of foamed region in which non-foamed portion is present)/ (surface area(mm$^2$) of foam molded product)]× 100

[Average Aspect Ratio of a Flattened Cell Layer and Average Aspect Ratio of a Circular Cell Layer]

A cross-sectional photograph of the foam molded product (cross-sectional-observation sample) was captured with scanning electron microscope SU1510 manufactured by Hitachi High-Technologies Corporation. It was confirmed that the surface layer ranging from the surface to a depth of 1000 μm has a layer including flattened cells and that an inner layer deeper than 1000 μm from the surface has a layer including circular cells. Through image processing of the cross-sectional photograph, at least 100 adjacent flattened cells or circular cells were measured by a caliper for the major axis and the minor axis. The average aspect ratio (length of major axis/length of minor axis) of the 100 cells was obtained. This procedure was performed at arbitrary three locations in each of the layers. The value obtained by averaging the three average values obtained at the three locations was defined as an average aspect ratio of a flattened cell layer or a circular cell layer.

[Density (Apparent Density)]

Size of the foam molded product was measured by slide calipers. Mass thereof was measured by an electron balance. The density (apparent density) was calculated by the following formula.

Density(g/cm$^3$)=(mass of foam molded product)/ (volume of foam molded product)

[Average Cell Diameter]

In the measurement of the average aspect ratio of the cells in the circular cell layer, the equivalent circle diameter corresponding to the area of a circular cell is defined as a cell diameter. The average value of such 100 cell diameters was obtained. This operation was conducted at arbitrary three locations of the circular cell layer. The three mean values obtained in the three locations were averaged and adopted as the average cell diameter.

[Rebound Resilience]

Rebound resilience was measured according to a method mentioned in JIS K 6400. A manually measuring tester was used. A steel ball was dropped from a stipulated height (H)

to a foam molded product. The maximum height (h) by rebound was read. Rebound resilience was calculated by the following formula.

Rebound resilience (%)=(maximum height(h) by rebound)/(stipulated height(H))×100

Three measurements were conducted within one minute. Median thereof was determined to calculate the rebound resilience. Rebound resilience (A) is a rebound resilience of area of foamed region in which non-foamed portion is not present. Rebound resilience (B) is a rebound resilience of area of foamed region in which non-foamed portion is present.

[Surface Smoothness]

The surface smoothness of the foam molded product was evaluated by visual inspection according to the three criteria described below.

○: Unevenness is not observed on the surface of the molded product.

Δ: Unevenness is observed in a part of the surface of the molded product.

×: Unevenness is observed on the entire surface of the molded product.

TABLE 2

|  |  |  | Example 1 | Example 2 | Example 3 | Example 4 | Example 5 | Example 6 | Example 7 |
|---|---|---|---|---|---|---|---|---|---|
| Processing conditions | Thermoplastic polyester elastomer resin | — | A | A | A | A' | A' | A' | B |
|  | Pressure of counter-pressure | MPa | 0.5 | 1.0 | 0.1 | 3.0 | 10.0 | 25.0 | 0.5 |
|  | Filling amount of the resin relative to the volume of the cavity | % | 14 | 35 | 50 | 20 | 20 | 20 | 20 |
|  | Core back amount | mm | — | — | — | — | — | — | — |
| Properties of foam molded product | Configuration of foam | — | (A) | (B) | (B) | (A) | (B) | (B) | (A) |
|  | Proportion of area of foamed region in which non-foamed portion is present | % | 0 | 39 | 54 | 0 | 20 | 17 | 0 |
|  | Proportion of area of foamed region in which non-foamed portion is present in relation to total surface area | % | 0 | 35 | 48 | 0 | 18 | 15 | 0 |
|  | Average aspect ratio of a flattened cell layer | — | 8.1 | 6.2 | 4.9 | 8.5 | 12.6 | 14.1 | 8.9 |
|  | Average aspect ratio of a circular cell layer | — | 1.2 | 1.3 | 1.5 | 1.2 | 1.2 | 1.4 | 1.4 |
|  | Density | g/cm$^3$ | 0.15 | 0.37 | 0.54 | 0.21 | 0.21 | 0.21 | 0.2 |
|  | Average cell diameter | μm | 390 | 320 | 300 | 190 | 250 | 200 | 350 |
|  | Rebound resilience (A) | % | 71 | 62 | 54 | 74 | 71 | 72 | 72 |
|  | Rebound resilience (B) | % | — | 56 | 49 | — | 67 | 68 | — |
|  | Surface smoothness | — | ○ | Δ | Δ | ○ | Δ | Δ | ○ |

|  |  |  | Example 8 | Example 9 | Example 10 | Comparative Example 1 | Comparative Example 2 | Comparative Example 3 |
|---|---|---|---|---|---|---|---|---|
| Processing conditions | Thermoplastic polyester elastomer resin | — | C | D | E | A' | A | A' |
|  | Pressure of counter-pressure | MPa | 0.5 | 1.0 | 1.0 | 0.0 | 35.0 | — |
|  | Filling amount of the resin relative to the volume of the cavity | % | 20 | 20 | 20 | 84 | 71 | — |
|  | Core back amount | mm | — | — | — | — | — | 12.0 |
| Properties of foam molded product | Configuration of foam | — | (B) | (B) | (B) | (B) | (B) | (C) |
|  | Proportion of area of foamed region in which non-foamed portion is present | % | 28 | 37 | 45 | 90 | 75 | 100 |
|  | Proportion of area of foamed region in which non-foamed portion is present in relation to total surface area | % | 25 | 33 | 40 | 80 | 67 | 90 |
|  | Average aspect ratio of a flattened cell layer | — | 8.0 | 7.7 | 5.8 | 3.1 | 10.1 | — |
|  | Average aspect ratio of a circular cell layer | — | 1.2 | 1.3 | 1.2 | 1.8 | 1.3 | 1.3 |
|  | Density | g/cm$^3$ | 0.23 | 0.23 | 0.25 | 0.90 | 0.76 | 0.21 |
|  | Average cell diameter | μm | 330 | 280 | 220 | 640 | 220 | 530 |
|  | Rebound resilience (A) | % | 60 | 53 | 45 | 53 | 53 | — |
|  | Rebound resilience (B) | % | 56 | 50 | 41 | 50 | 49 | 66 |
|  | Surface smoothness | — | Δ | Δ | Δ | × | Δ | × |

As is clear from Table 2, Examples 1 to 10 that are within the range of the present invention are the foam molded product (A) which is constituted from a surface layer consisting of only a foamed region in which a non-foamed portion is not present, or the foam molded product (B) which has a surface layer consisting of both a foamed region in which the non-foamed portion is present and a foamed region in which the non-foamed portion is not present, and exhibit light weight and high rebound resilience. The foam molded products (B) of Examples 2, 3, 5, 6, and 8 to 10 and Comparative Examples 1 and 2 have a largest-area non-foamed portion in the surface opposite from the surface with a gate, and also have a non-foamed portion having almost the same area in the surface with the gate. It is understood from Examples 2, 3, 5, 6, and 8 to 10 that the foamed region in which the non-foamed portion is not present has a higher rebound resilience than that of the foamed region in which the non-foamed portion is present. The foam molded products of Examples 1, 4, and 7 as a whole are constituted from only the foamed region in which the non-foamed portion is not present, and have flattened cells around the entire surface of the foam molded product, and thus they have excellent surface smoothness. In contrast, the foam molded product of Comparative Example 1 obtained by short-shot foam molding without counter-pressure results in having a density of 0.90 g/cm$^3$ and being thus not sufficiently reduced in weight. In addition, the foam molded product of Comparative Example 1 has poor surface smoothness because it has, around the surface layer, flattened cells that have an average aspect ratio less than the prescribed average aspect ratio. The foam molded product of Comparative Example 2 was obtained by foaming using counter-pressure, but the pressure of counter-pressure was too high. Therefore, the foam molded product of Comparative Example 2 has poor foam moldability, and has a density of 0.76 g/cm$^3$, being not sufficiently reduced in weight. The foam molded product of Comparative Example 3 was obtained by foam molding according to a core-back foam injection molding method and was sufficiently reduced in weight. The foam molded product of Comparative Example 3 as a whole, however, consists of a sandwich structure including the non-foamed layer and the foamed layer and has poor surface smoothness due to thereby generated unevenness on the entire surface of the molded product.

Figure 4:
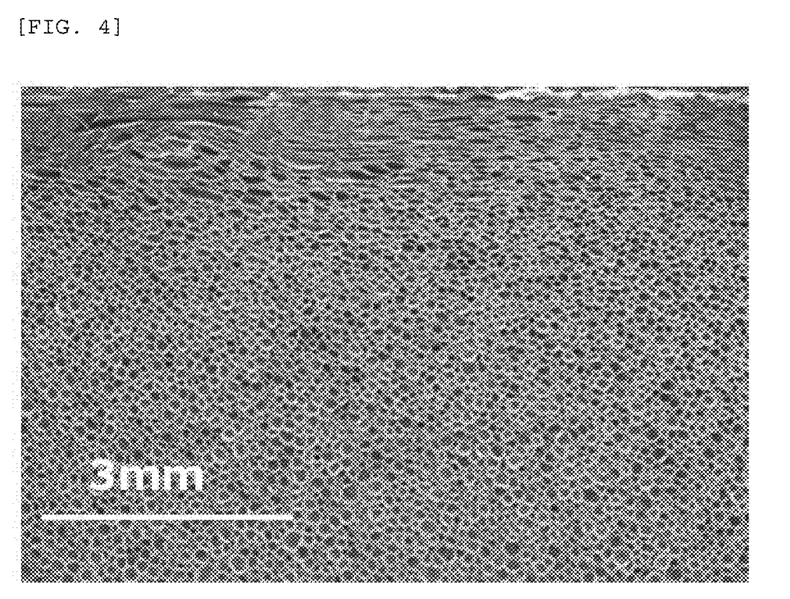
FIG. 4 is a cross-sectional photograph around the surface of a foam molded product of Example 1 (the uppermost portion in the photograph is the surface).
Figure 5:
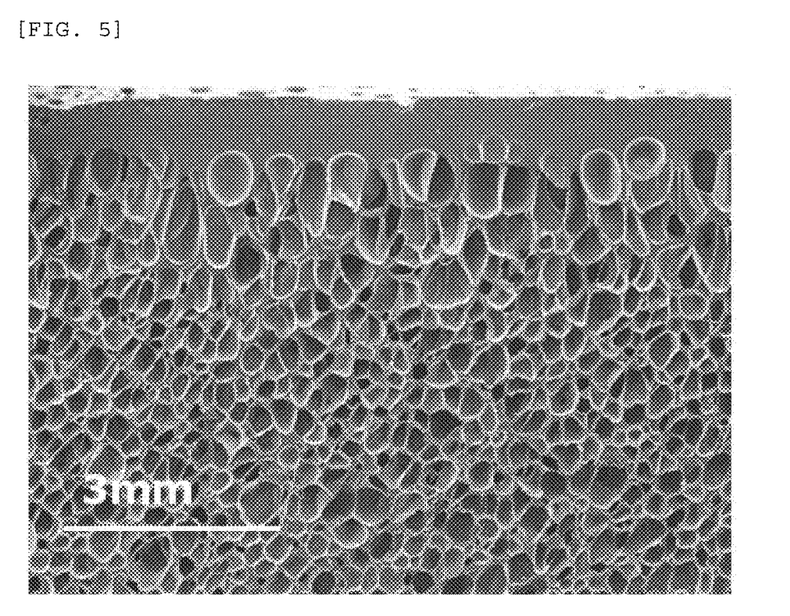
FIG. 5 is a cross-sectional photograph around the surface of a foam molded product of Comparative Example 3 (the uppermost portion in the photograph is the surface).

FIG. 4 shows a cross-sectional photograph of the foam molded product of Example 1. The foam molded product of Example 1 is understood to have flattened cells around the surface layer. FIG. 5 shows a cross-sectional photograph of the foam molded product of Comparative Example 3. The surface layer is understood to be a non-foamed skin layer.

INDUSTRIAL APPLICABILITY

The foam molded product of the present invention are not only excellent in its lightweight but also can achieve very high rebound resilience and excellent surface smoothness. Further, they exhibit a uniform foamed state in spite of their high foaming ratio, high heat resistance, high water resistance and high molding stability. Accordingly, the foam molded product of the present invention can be applied even to the parts which are necessary to have high reliability.

EXPLANATION OF REFERENCE NUMBER

1: Mold (for fixation)
2: Mold (for movement)
3: Cavity
4: Injection molding machine
4a: Plasticizing region
5: Gas bomb
6: Pressure-raising pump
7: Pressure-controlling bulb
8: Counter-pressure device
9: Electromagnetic valve for intake
10: Electromagnetic valve for exhaust
21: Non-foamed portion
22: Surface layer
23: Inner layer
24: Area of foamed region in which non-foamed portion is not present
25: Area of foamed region in which non-foamed portion is present

The invention claimed is:

1. A foam molded product comprising a continuous phase formed of a resin component containing a thermoplastic polyester elastomer, wherein the thermoplastic polyester elastomer is prepared by bonding a hard segment and a soft segment, wherein the hard segment consists of polyester constituted from aromatic dicarboxylic acid and aliphatic and/or alicyclic diol as constituting components, wherein the soft segment is at least one member selected from the group consisting of aliphatic polyether, aliphatic polyester and aliphatic polycarbonate,
wherein
(a) the foam molded product is constituted from, a first surface layer consisting of only a foamed region in which a non-foamed portion having a cell density of 10% or less is not present, the first surface layer ranging from a surface of the foam molded product to a depth of 1000 μm, or
(b) the foam molded product has, a second surface layer consisting of both a foamed region in which the non-foamed portion is present and a foamed region in which the non-foamed portion is not present, the second surface layer ranging from the surface of the foam molded product to the depth of 1000 μm,
wherein the foam molded product has a density of 0.01 to 0.70 g/cm$^3$, and
wherein the foamed region of the first surface layer in which the non-foamed portion is not present has a flattened cell layer comprising cells having an average aspect ratio of 4.0 to 15.0.

2. The foam molded product according to claim 1, wherein the foam molded product further has, in an inner layer deeper than the depth of 1000 μm from the surface, a circular cell layer comprising cells having an average aspect ratio of 1.0 to 2.0.

3. A method for producing the foam molded product according to claim 1 by using a counter-pressure foam injection molding method, the method comprising: infusing a pressure gas into a cavity of a mold after completely closing the mold; starting injection of a resin component containing a molten-state thermoplastic polyester elastomer together with a chemical foaming agent and/or an inert gas in a supercritical state when a gas pressure in the cavity reaches a prescribed pressure; and rapidly releasing the pressure gas immediately after filling 10 to 55% of a volume of the cavity with the resin component or after a prescribed time.

4. The method for producing the foam molded product according to claim 3, wherein the inert gas in a supercritical state is nitrogen.

* * * * *